US 8,750,721 B2

(12) United States Patent
Irie

(10) Patent No.: US 8,750,721 B2
(45) Date of Patent: *Jun. 10, 2014

(54) OPTICAL TRANSMITTING APPARATUS AND OPTICAL COMMUNICATION SYSTEM

(75) Inventor: Yasuyuki Irie, Kanagawa (JP)

(73) Assignee: Kyocera Corporation, Kyoto (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/524,944

(22) Filed: Jun. 15, 2012

(65) Prior Publication Data

US 2012/0301155 A1 Nov. 29, 2012

Related U.S. Application Data

(63) Continuation of application No. 11/575,744, filed as application No. PCT/JP2005/016812 on Sep. 13, 2005, now Pat. No. 8,254,791.

(30) Foreign Application Priority Data

Sep. 22, 2004 (JP) ................................. 2004-275705
Sep. 22, 2004 (JP) ................................. 2004-275706

(51) Int. Cl.
*H04B 10/50* (2013.01)
*H04B 10/116* (2013.01)

(52) U.S. Cl.
USPC .......................... 398/183; 398/172; 398/201

(58) Field of Classification Search
USPC .......................................... 398/172, 183, 201
See application file for complete search history.

(56) References Cited

U.S. PATENT DOCUMENTS

| 6,271,815 | B1* | 8/2001 | Yang et al. ..................... 345/82 |
| 7,447,442 | B2 | 11/2008 | Oda et al. |
| 2002/0167701 | A1* | 11/2002 | Hirata ............................ 359/172 |
| 2003/0067660 | A1* | 4/2003 | Oda et al. ...................... 359/172 |
| 2005/0196179 | A1 | 9/2005 | Haruyama ..................... 398/208 |
| 2006/0056855 | A1 | 3/2006 | Nakagawa et al. ............ 398/183 |

FOREIGN PATENT DOCUMENTS

| JP | 2002-290335 | 10/2002 |
| JP | 2003-115803 | 4/2003 |
| JP | 2004-072365 | 3/2004 |
| JP | 2004-120101 | 4/2004 |
| JP | 2004-297425 | 10/2004 |
| JP | 2005-216780 | 8/2005 |

OTHER PUBLICATIONS

"What is Visible Light Communication?", online, Visible Light Communication Consortium, Sep. 7, 2004 Searched, Internet http://wwvv.vlcc.net/about.html.

(Continued)

Primary Examiner — Nathan Curs
(74) Attorney, Agent, or Firm — DLA Piper LLP (US)

(57) ABSTRACT

A light source control section 15 selects a first light emitting device arrangement (color combination device group) in which LEDs 19 make a particular visible light color by color synthesis and form one optical communication channel, and then causes the first light emitting device arrangement to emit light, and selects a second light emitting device arrangement so that a light quantity of a light source 18 as a whole becomes uniform, and then causes the selected second light emitting device arrangement to emit light when the first light emitting device arrangement does not emit light. As a result, upon performing optical communication, an optical transmitting apparatus and an optical communication system that can emit an illumination light at a uniform light quantity without generating a flicker of illumination can be realized.

6 Claims, 7 Drawing Sheets

(56) References Cited

OTHER PUBLICATIONS

Japanese language office action dated Aug. 31, 2010 and its English language translation for corresponding Japanese application 2004-275705.
Japanese language office action dated Aug. 31, 2010 and its English language translation for corresponding Japanese application 2004-275706.
Japanese language office action dated May 10, 2011 and its English language translation for corresponding Japanese application 2004-275705.
Japanese language office action dated May 10, 2010 and its English language translation for corresponding Japanese application 2004-275705.
Japanese language office action dated May 10, 2010 and its English language translation issued in corresponding Japanese application 2004275706.

* cited by examiner

FIG. 2

| | | | | | | | | | |
|---|---|---|---|---|---|---|---|---|---|
| a(7) | a(8) | a(1) | a(2) | a(7) | a(8) | a(1) | a(2) | | |
| | | | | p(4) | | p(1) | | | |
| b(8) | b(7) | b(2) | b(1) | b(8) | b(7) | b(2) | b(1) | | |
| a(5) | a(6) | a(3) | a(4) | a(5) | a(6) | a(3) | a(4) | | |
| | | | | p(3) | | p(2) | | | |
| b(6) | b(5) | b(4) | b(3) | b(6) | b(5) | b(4) | b(3) | | |

18, 18a

OPTICAL TRANSMITTING APPARATUS AND OPTICAL COMMUNICATION SYSTEM

TECHNICAL FIELD

The present invention relates to an optical transmitting apparatus and an optical communication system and, more particularly, a technology to perform an optical communication by using visible light and also utilize the light as an illumination light.

BACKGROUND ART

Nowadays use of the optical communication utilizing infrared rays or a visible light is spreading. In this event, the infrared-ray communication has such problems that, since transmission is not performed at high electric power from the perspective of eye safety (eye protection), a communication speed cannot be increased, etc.

In contrast, the visible light communication uses a visible light device such as an LED (Light Emitting Diode) that can vary the color as a light source. Therefore, this visible light communication possesses such advantages that the above problem in the infrared communication can be solved, and data can be transmitted by utilizing a characteristic that the visible light device can be turned ON/OFF at a high rate, etc. (see Non-Patent Literature 1).

Such visible light device is used as not only for the optical communication but also the illumination light.

For example, in the apparatus set forth in Patent Literature 1, three types of LEDs that respectively emit lights of red (R), green (G), blue (B) color of three primary colors of light are used in such a way that thee apparatus illuminates white light by a mixed color and also performs multicolor communication by superimposing respective individual data on each of the LEDs.

In this case, a light quantity used in the visible light communication is required to satisfy satisfactorily a light quantity as the illumination light.

For example, in the apparatus set forth in Patent Literature 2, the LED is caused to emit light based on the reverse pulse position modulation in which ON/OFF positions of the pulse signal train are inverted. In this pulse signal train, the LED emits a light (ON) in a pulse range and the LED does not emit light (OFF) in a flat range. Therefore, ON time period of the pulse is prolonged to improve a luminous intensity of illumination in performing communication.

Patent Literature 1: JP-A-2002-290335
Patent Literature 2: JP-A-2004-72365
Non-Patent Literature 1: "What is Visible Light Communication", [online], Visible Light Communication Consortium, 2004 Sep. 7 Searched, Internet <Error!Hyperlink reference not valid.>

DISCLOSURE OF THE INVENTION

Problems that the Invention is to Solve

However, in the above-described related arts, there were the problems given in the following.

That is, in the apparatus set forth in Patent Literature 1, there were the problems that, since the LEDs of RGB emit light at different timings respectively, a white light cannot be maintained as illumination, and as a result a flicker of the illumination is generated, which becomes conspicuous when the frequency-division multiplexing is employed.

Also, in the apparatus set forth in Patent Literature 2, even though an illumination time of the LED was prolonged by reversing ON/OFF of the pulse, a flicker of the illumination could not be eliminated yet since an OFF time was still present.

It is an object of the present invention to provide an optical transmitting apparatus and an optical communication system, capable of emitting an illumination light at a uniform light quantity without generating a flicker of the illumination in performing optical communication.

Means for Solving the Problems

The gist of the present invention to solve the above problems will be given by following.

(1) An optical transmitting apparatus, comprising:
an electric signal generating section for generating an electric signal by converting a predetermined input signal;
a light source in which a plurality of light emitting devices are arranged; and
a light source control section for converting the electric signal into an optical signal and turning ON/OFF the light emitting devices to emit light,
wherein the optical transmitting apparatus emits visible light by emission of the light emitting devices and performs optical communication by turning ON/OFF the light emitting devices,
the light source has a plurality of light emitting device groups each being formed of a plurality of the light emitting devices, and
the light source control section controls the respective light emitting devices in response to a light quantity of the respective light emitting device groups.

(2) The light source control section selects a color combination device group which forms one optical communication channel and makes a particular visible light color by color synthesis, and
the light source control section causes the color combination device group to emit light.

(3) The color combination device group is formed of the light emitting devices of two colors that make a white light by a complementary color, or the light emitting devices of three colors that make a white light by three primary colors of light.

(4) The color combination device group is arranged repeatedly over an illumination surface of the light source, and
a plurality of the color combination device groups are arranged with a number of the color combination device groups in one aggregation being the same as that of the input signal.

(5) When the color combination device group used for the optical communication does not emit light, the light source control section causes the color combination device group not used for the optical communication to emit light so that a light quantity of the light source as a whole becomes substantially uniform.

(6) When the light emitting device used for the optical communication does not emit light, the light source control section causes the light emitting device not used for the optical communication to emit light so that a light quantity of the light source as a whole becomes substantially uniform.

(7) The light source has the light emitting device groups being arranged, the light emitting device groups each having, as a constituent unit, the light emitting devices that make a particular visible light color by color synthesis and form one optical communication channel.

(8) The light emitting device groups include a first light emitting device arrangement that is turned ON/OFF during the optical communication, and a second light emitting device arrangement that emits light to supplement an insufficient light quantity when the first light emitting device arrangement does not emit light.

(9) The light emitting device group is arranged repeatedly over an illumination surface of the light source, and a plurality of the light emitting device groups are arranged with a number of the light emitting device groups in one aggregation being the same as that of the input signal.

(10) The electric signal generating section generates a communication signal S(i) indicating ON/OFF of the light emitting device and a reverse signal R(i) generated by inverting the communication signal S(i), in response to the input signal P(i) (i=1, 2, . . . , n), and the light source control section causes the first light emitting device arrangement to emit light based on the communication signal S(i), and causes the second light emitting device arrangement to emit light based on the reverse signal R(i).

(11) The light emitting device groups include a communication device group q(i) that is turned ON/OFF during the optical communication, and a light adjusting device group that emits light to supplement an insufficient light quantity when any of the communication device groups q(i) does not emit light, in response to the input signal P(i) (i=1, 2, . . . , n)

(12) A light intensity of the light adjusting device group varies in response to a sum of light quantities of the communication device groups q(i).

(13) In the light source, the communication device group q(i) is formed of LEDs and the light adjusting device group is formed of a fluorescent lamp.

(14) The electric signal generating section generates a communication signal S(i) indicating ON/OFF of the light emitting device and a light adjusting signal for supplementing an insufficient light quantity for a sum of a light quantity of the communication signal S(i), and the light source control section causes the communication device group q(i) to emit light based on the communication signal S(i), and causes the light adjusting device group to emit light based on the light adjusting signal.

(15) The electric signal generating section generates an amplified communication signal by adding a direct current component having a constant amplitude to the communication signal S(i), and generates an amplified light adjusting signal by adding the direct current component to the light adjusting signal, and the light source control section causes the communication device group q(i) to emit light based on the amplified communication signal, and causes the light adjusting device group to emit light based on the amplified light adjusting signal.

(16) An optical communication system, comprising:

the above optical transmitting apparatus; and an optical receiving apparatus for receiving the optical signal to extract the input signal, wherein the optical receiving apparatus does not extract the input signal from the optical signal which is emitted from the light emitting device not used for the optical communication, based on an eigenvalue of the optical signal.

Advantages of the Invention

According to the above-described configurations, the color combination device group in which the light emitting devices make a particular visible light color by the color synthesis and also form one optical communication channel is selected, and then the color combination device groups are caused to emit light synchronously. Therefore, a flicker of the illumination light can be prevented while maintaining a particular color light continuously.

Also, even when the light emitting devices used for the optical communication do not emit light, a light quantity of the light source as a whole can be made uniform by causing the light emitting devices not used for the optical communication to emit light. Therefore, a uniform light quantity can be maintained in the light source as a whole irrespective of the contents of the input signals, and thus a flicker of the illumination can be prevented.

BRIEF DESCRIPTION OF THE DRAWINGS

FIG. 2 A view showing a first arrangement pattern of LEDs of a light source according to the first embodiment.

Figure 1:
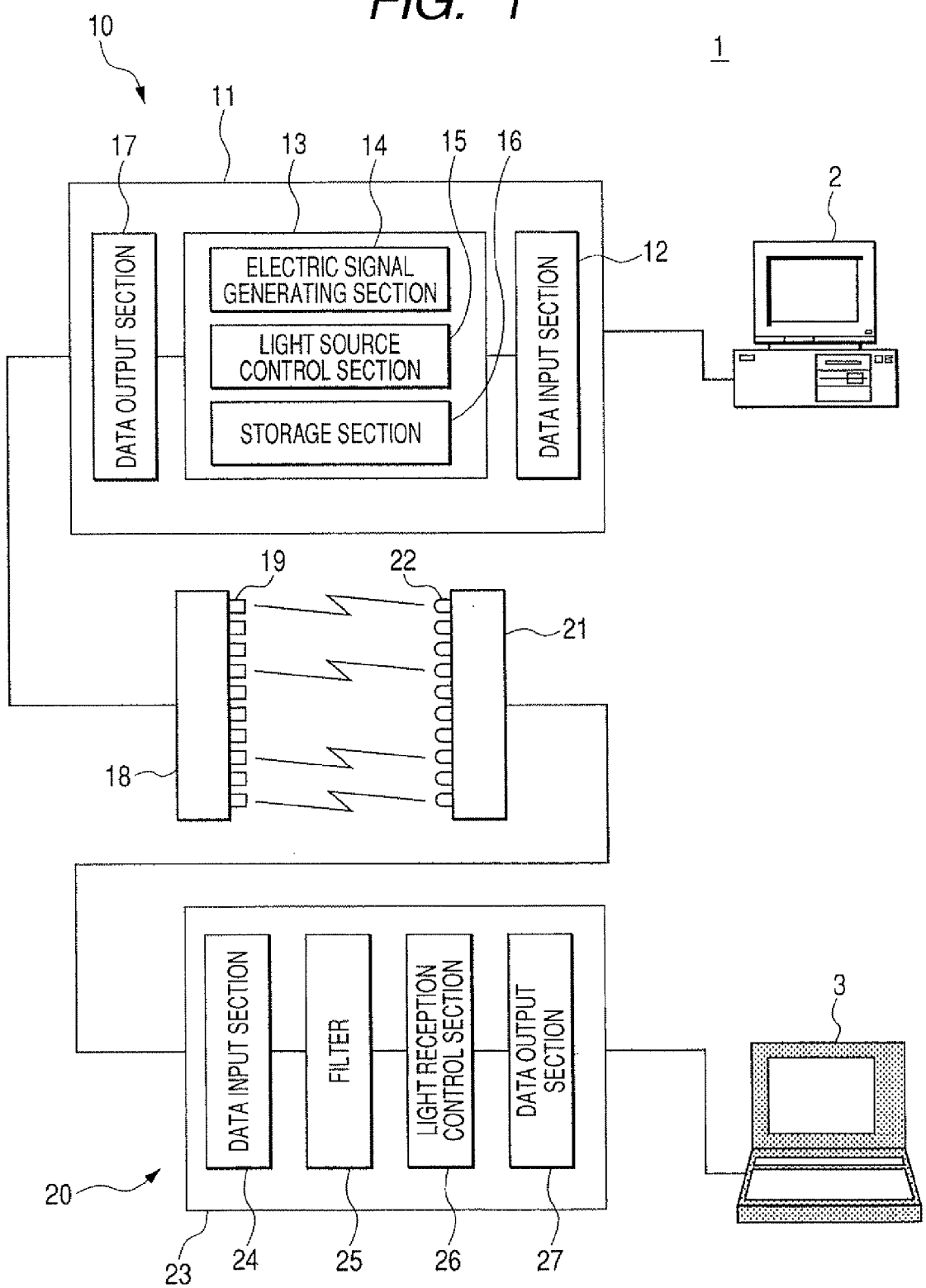
FIG. 1 A view showing a schematic configuration of an optical communication system according to a first embodiment.

DESCRIPTION OF REFERENCE NUMERALS 10 optical transmitting apparatus
11 optical transmitter main body
13 control section
14 electric signal generating section
15 light source control section
18 light source unit (light source)
19 LED (light emitting device)
20 optical receiving apparatus
21 optical receiver
25 light reception control section
27 filter

BEST MODE FOR CARRYING OUT THE INVENTION

A preferred embodiment (first embodiment) of an optical communication system of the present invention will be explained with reference to FIG. 1 to FIG. 5 hereinafter.

FIG. 1 is a view showing a schematic configuration of an optical communication system of the present embodiment (first embodiment), and FIG. 2 is a view showing a first arrangement pattern of LEDs of a light source in the present embodiment.

Figure 5A:
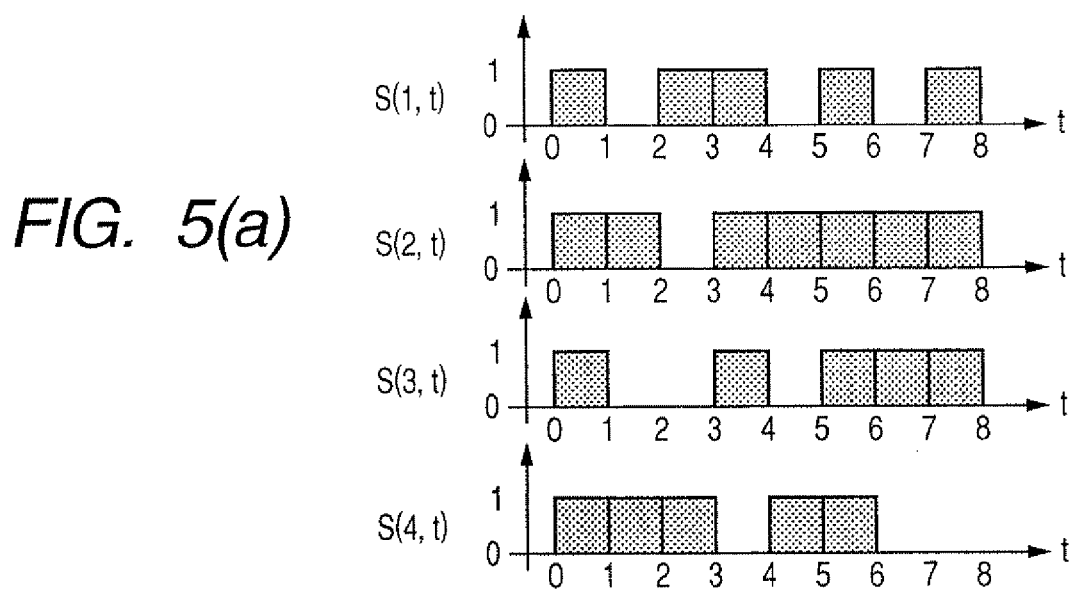
FIG. 5 (a) is a pulse diagram showing communication signals in the first embodiment, (b) is a pulse diagram showing reverse signals in the first embodiment, and (c) is a view showing a light quantity of a light source as a whole in the first embodiment.
Figure 5B:
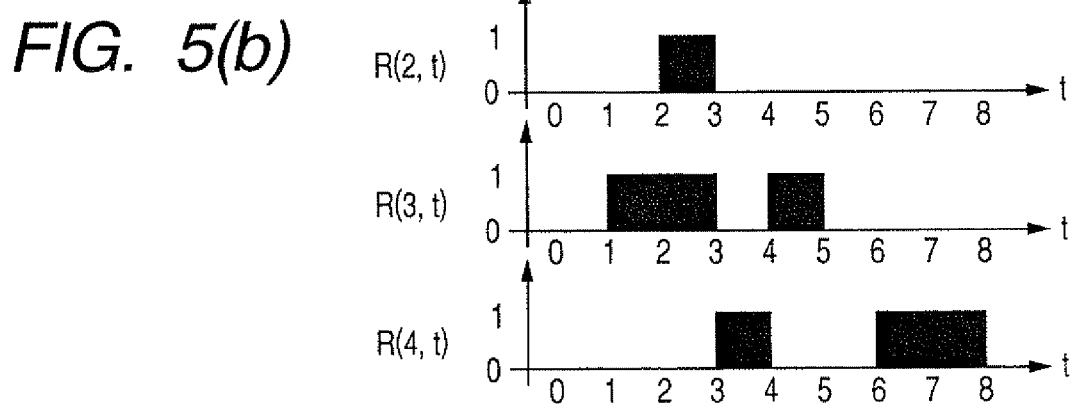
Figure 5C:
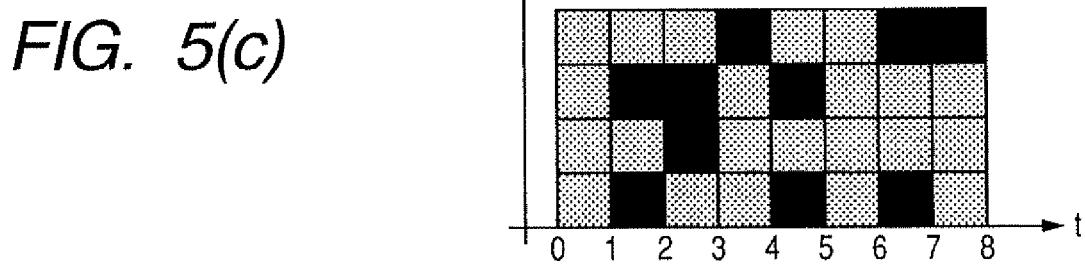

FIG. 5(a) is a pulse diagram showing communication signals in the present embodiment (ordinate axis; ON/OFF, abscissa axis; time), FIG. 5(b) is a pulse diagram showing reverse signals in the present embodiment (ordinate axis; ON/OFF, abscissa axis; time), and FIG. 5(c) is a view showing a light quantity of a light source as a whole in the present embodiment (ordinate axis; light quantity, abscissa axis; time, dot portion; communication signal, black portion; reverse signal).

As shown in FIG. 1, an optical communication system 1 of the present embodiment includes an optical transmitting apparatus 10 and an optical receiving apparatus 20. For example, this optical communication system 1 emits a visible light as a carrier wave by modulating an input signal such as characters, sounds and images that is input from the transmitter side device and also outputs the input signal extracted from the received light to the receiver side device, between information devices such as PC (Personal Computer) and PDA (Personal Digital Assistant), or between the PC and the peripheral device such as printer.

In the present embodiment, an example of the optical communication system 1 performing the optical communication between a transmitter side PC 2 and a receiver side PC 3 is described. Concrete configurations of the optical transmitting apparatus 10 and the optical receiving apparatus 20 in the optical communication system 1 will be explained hereunder.

The optical transmitting apparatus 10 has an optical transmitter main body 11 connected to the transmitter side PC 2, and a light source unit (light source) 18 connected to this main body 11. The optical transmitter main body 11 converts an input signal P(i) [i; number of signals] input from the transmitter side PC 2 into an electric signal, and then the light source unit 18 transmits optical signals based on the electric signal and also emits light as illumination.

The optical transmitter main body 11 is configured with a data input section 12, a transmission control section 13, and a data output section 17.

The data input section 12 binarizes the analog or digital input signal P(i), and divides the input signal by the number of signals i even when input signal P(i) is either the multiple signal or a plurality of single signals.

The transmission control section 13 has constituent elements such as an electric signal generating section 14, a light source control section 15, a storage section 16 and a CPU (not shown). This transmission control section 13 is constructed as the device that can fulfill functions of converting the input signal P(i) into the electric signal and causing the light source unit 18 to emit light based on this electric signal, when the CPU executes based on the instruction of the program for the electric signal generating section 14 and the light source control section 15.

This program has a communication signal generating function, a reverse signal generating function, and a light emitting device selecting function. This program is constructed to cause the electric signal generating section 14 to perform the communication signal generating function and the reverse signal generating function, and cause the light source control section 15 to perform the light emitting device selecting function.

Concretely, the electric signal generating section 14 generates a communication signal S(i,t) [t; number of bits, time] indicating the flashing (ON/OFF) of LEDs 19 and a reverse signal R(i,t) obtained by inverting the communication signal S(i, t), as electric signals by converting the input signal P(i).

As shown in FIG. 5(a), the communication signal S(i,t) is an 8-bit pulse signal train wherein "1" indicates ON (lighted) and "0" indicates OFF (unlighted). The reverse signal R(i,t) is a pulse signal train wherein "1" and "0" of the communication signal S(i,t) are inverted.

The light source control section 15 selects a first light emitting device arrangement (color combination device group) in which the LEDs (light emitting devices) 19 make a particular visible light color by color synthesis and form one optical communication channel, and then causes the first light emitting device arrangement to emit light. When the first light emitting device arrangement does not emit light, this light source control section 15 selects a second light emitting device arrangement (color combination device group) such that a light quantity of the light source unit 18 as a whole becomes uniform, and then causes the selected second light emitting device arrangement to emit light.

Now, as shown in FIG. 1 and FIG. 2, the light source unit 18 converts the input communication signal S and the input reverse signal R (electric signals) into optical signals to emit light. A plurality of LEDs 19 are arranged in plural on an illumination surface of the light source unit 18. The LEDs 19 emit a visible light having a unique spectrum respectively, and are arranged in accordance with a first arrangement pattern described hereunder.

The first arrangement pattern is a pattern in which the LEDs 19 used for the optical communication and the LEDs 19 not used for the optical communication are arranged uniformly. A complementary color relation (a,b) in which monochromatic lights from two LEDs 19 form a white light (visible light color) by synthesis is employed as a constituent unit.

Two LEDs 19 in this complementary color relation (a,b) are turned ON/OFF in synchronism with the electric signal to form one optical communication channel.

Such first arrangement pattern contains two sets of LEDs 19 in the complementary color relation (a,b) as the first light emitting device arrangement (a(k), b(k)) for the optical communication and the second light emitting device arrangement (a(k+1), b(k+1)) for the light adjustment respectively, forms a polygon in which i number of light emitting device groups {p(i); (a(k), b(k)), (a(k+1),b(k+1)), [k=2×i−1]} made of these light emitting device arrangements are arranged.

Here, the number i of the light emitting device groups p(i) is equal to the number of signals i of the input signal P(i) correspondingly. In the case of the present embodiment, the number of signals i is four. In this case, a constituent unit of the light emitting device groups p(i) is four LEDs 19 arranged in a square cell.

Also, the light emitting device groups p(1) to p(4) as one aggregation are arranged repeatedly on the overall illumination surface of the light source unit 18.

The first light emitting device arrangement (a(k),b(k)) includes two LEDs 19 that are turned ON/OFF during the optical communication, and is located on one diagonal line of the square cell.

The second light emitting device arrangement (a(k+1),b(k+1)) includes two LEDs 19 that emit light to supplement an insufficient light quantity when the first light emitting device arrangement does not emit light, and is located on the other diagonal line of the square cell.

For example, the light emitting device group p(3) corresponds to the third input signal P(3), and includes the first light emitting device arrangement (a(5),b(5)) and the second light emitting device arrangement (a(6),b(6)).

In this case, around this light emitting device group p(3), two light emitting device groups p(2) and two light emitting device groups p(4) are arranged adjacently. A light shielding wall 18a is formed in their boundary portions to surround the light emitting device group p(3). This light shielding wall 18a is provided not to leak an internal light of the light emitting device group p(3) and to block entering of an external light, and has a function of enhancing a color mixture precision of the light emitting device group p(3). The above configuration is similar in other light emitting device groups p(1),p(2),p(4).

Relations between the input signal P(i) and the light emitting device group p(i), relations between the first light emitting device arrangement (a(k),b(k)) and the second light emitting device arrangement (a(k+1),b(k+1)), etc., in such first arrangement pattern are stored in the storage section 16.

Then, the light source control section 15 selects the first light emitting device arrangement (a(k),b(k)) from the storage section 16 based on the communication signal S(i,t) generated by the electric signal generating section 14 and causes this selected first light emitting device arrangement (a(k),b(k)) to emit light. Also, the light source control section 15 selects the second light emitting device arrangement (a(k+1), b(k+1)) from the storage section 16 based on the reverse signal R(i,t) generated by the electric signal generating section 14 and causes this selected second light emitting device arrangement (a(k+1), b(k+1)) to emit light.

In this case, the data output section 17 shapes a waveform of the output value (the communication signal and the reverse signal) from the light source control section 15, and outputs the shaped waveforms to the light source unit 18.

As shown in FIG. 1, the optical receiving apparatus 20 has an optical receiver 21 arranged to oppose to the light source unit 18 with a predetermined distance, and an optical receiver main body 23 connected to this optical receiver 21. The optical receiver main body 23 extracts the input signal P (i) from the optical signal received by the optical receiver 21, and sends out this input signal P(i) to the receiver side PC3 connected to the optical receiver main body 23.

The optical receiver 21 receives a multiple optical signal in which the communication signal S (i,t) and the reverse signal R(i,t) are synthesized, and converts this multiple optical signal into the electric signal. Light receiving devices 22 such as CCD and CMOS are arranged on a light receiving surface as many as the LEDs 19 on the light source unit 18 side in the same pattern as the first arrangement pattern.

The optical receiver main body 23 includes a data input section 24, a filter 25, a light reception control section 26, and a data output section 27.

The data input section 24 binarizes the electric signal from the optical receiver 21.

The filter 25 passes the electric signal having a particular frequency and blocks electric signals other than that.

This "particular frequency" corresponds to a spectrum of the light emitted from the LEDs 19 for the optical communication.

Also, based on the spectrum of the received light, the light reception control section 26 causes the filter 25 to pass a synthesized portion of the communication signal S(i,t) and divides the passed portion by the number of signals i, and causes the filter 25 to block a synthesized portion of the reverse signal R(i,t).

Further, based on the spectrum of the received light, a synthesized portion of the communication signals S(1,t) to S(4,t) is passed by the filter 25 and a synthesized portion of the reverse signals R(1,t) to R(4,t) is blocked by the filter 25.

The data output section 27 generates the input signal P(i) by shaping the waveform of the output value from the light reception control section 26 according to the instruction issued from the light reception control section 26, and outputs this input signal P(i) to the receiver side PC 3.

Figure 3:
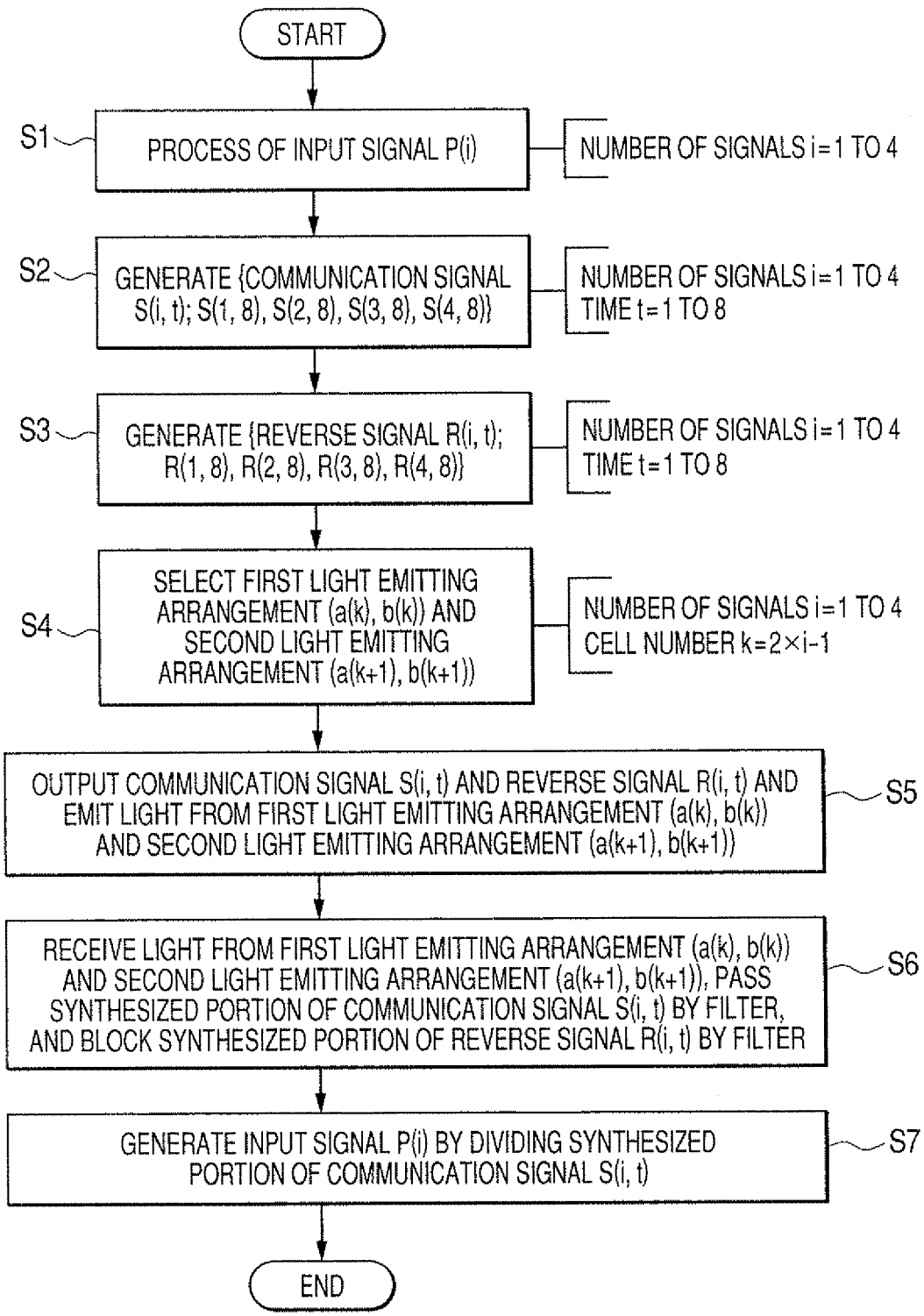
FIG. 3 A flowchart showing a flow of processes in the optical communication system of the first embodiment.
Figure 4A:
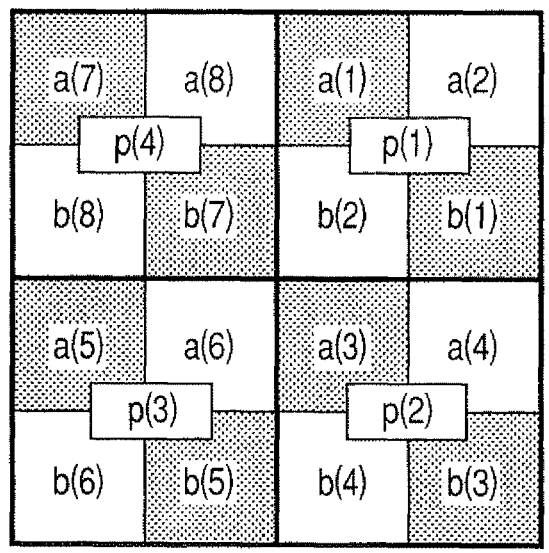
FIG. 4 (a) is a view showing a transmitting state of a light source at a particular time (t=1) in the first embodiment, and (b) is a view showing a transmitting state of the same light source at a particular time (t=2).
Figure 4B:
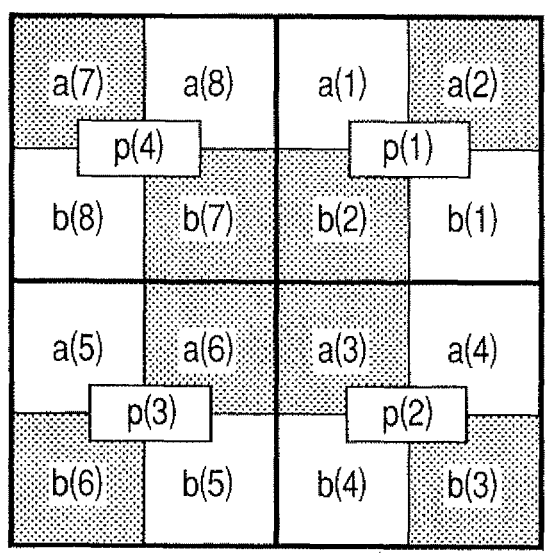

FIG. 3 is a flowchart showing a flow of processes in the optical communication system of the present embodiment. FIG. 4(a) is a view showing a transmitting state of a light source at a particular time (t=1) in the present embodiment, and FIG. 4(b) is a view showing a transmitting state of the same light source at a particular time (t=2) (In FIG. 4, a black portion denotes "lighting", and a white portion denotes "non-lighting"). Processes, operations, etc., of the optical communication system 1 of the present embodiment will be explained with reference to FIG. 3 and FIG. 4 and other figures such as FIG. 1, etc., hereunder.

As shown in FIG. 3, processes from S1 to S5 are executed by the optical transmitting apparatus 10, and processes from S6 to S7 are executed by the optical receiving apparatus 20.

In S1, the data input section 12 executes the above processes as for the input signals P(1) to P(4) from the transmitter side PC2.

In S2, the electric signal generating section 14 generates the communication signals S(1,t) to S(4,t) based on the input signals P(1) to P(4) (see FIG. 5(a)). This "t" denotes the number of bits of the pulse signal train, and denotes a unit time when the communication signals S(i,t) are changed in time.

For example, the communication signal S(1,3) signifies that "1 (ON)" signal is stored in the third bit of the pulse signal train corresponding to the input signal P(1) and this "1 (ON)" signal is output after 3 units of time (e.g., 3 second).

In S3, the electric signal generating section 14 generates the reverse signals R(1,t) to R(4,t), in which "1 (ON)" signal and "0 (OFF)" signal are inverted, corresponding to the communication signals S(1,t) to S(4,t) (see FIG. 5(b)).

Here, "t" has the same meaning as "t" in the communication signals S(1,t) to S(4,t). For example, the reverse signals are {R(1,t); 0,1,0,0,1,0,1,0} with respect to the communication signals {S(1,t); 1,0,1,1,0,1,0,1} (see FIGS. 5(a),(b)).

In S4, the light source control section 15 selects, corresponding to the input signals P(1) to P(4), the first light emitting arrangement (a(k),b(k)) and the second light emitting arrangement (a(k+1),b(k+1)) [k=2×i−1] in respective light emitting device groups p(1) to p(4) based on the contents stored in the storage section 16 (see FIG. 2). For example, light emitting device group p(2) corresponds to the input signal P(2), and includes the first light emitting arrangement (a(3),b(3)) and the second light emitting arrangement (a(4),b (4)).

In S5, the light source control section 15 outputs the communication signals S(1,t) to S(4,t) and the reverse signals R(1,t) to R(4,t), and emits light from the first light emitting arrangement (a(k),b(k)) based on the communication signals S(1,t) to S(4,t) and emits light from the second light emitting arrangement (a(k+1),b(k+1)) based on the reverse signals R(1,t) to R(4,t).

In this case, for example, as shown in FIG. 5(a), all the communication signals S(1,1) to S(4,1) are "1 (ON)" signal at the unit time t=1. Therefore, all the first light emitting arrangements (a(1),b(1)), (a(3),b(3)), (a(5),b(5)), and (a(7),b (7)) are turned ON (see FIG. 4(a)).

In contrast, as shown in FIG. 5(b), all the reverse signals R(1,1) to R(4,1) are "0 (OFF)" signal. Therefore, all the second light emitting arrangements (a(2),b(2)), (a(4),b(4)), (a(6),b(6)), and (a(8),b(8)) are turned OFF (see FIG. 4(a)).

Also, as shown in FIG. 5(b), the communication signals S(1,2) and S(3,2) are "0 (OFF)" signal and the communication signals S(2,2) and S(4,2) are "1 (ON)" signal at the unit time t=2. Therefore, the first light emitting arrangements (a(1),b(1)) and (a(5),b(5)) are turned OFF and also the first light emitting arrangements (a(3),b(3)) and (a(7),b(7)) are turned ON (see FIG. 4(b)).

In contrast, the reverse signals R(1,2) and R(3,2) are "1 (ON)" signal and the reverse signals R(2,2) and R(4,2) are "0 (OFF)" signal. Therefore, the second light emitting arrangements (a(2),b(2)) and (a(6),b(6)) are turned ON and the second light emitting arrangements (a(4),b(4)) and (a(8),b(8)) are turned OFF (see FIG. 4(*b*)).

Such processes in S5 are similar at the unit time t=3 to 8.

In this manner, even when any one of the first light emitting arrangement (a(k),b(k)) or the second light emitting arrangement (a(k+1), b(k+1)) in the light emitting device group p(i) is turned ON, a balance of the light quantity can be maintained uniformly irrespective of data contents (ON/OFF) of the communication signal S(i,t) because the other arrangement is turned OFF. As a result, the light quantity of the light source unit 18 as a whole can be maintained uniformly (see FIG. 5(*c*)).

In contrast, in S6, the optical receiver 21 receives the multiple optical signal in which the communication signals S(1,*t*) to S(4,*t*) and the reverse signals R(1,*t*) to R(4,*t*) are synthesized. In this multiple optical signal, respective light quantities of the communication signals S(1,*t*) to S(4,*t*) and respective light quantities of the reverse signals R(1,*t*) to R(4,*t*) are synthesized for every unit time. A light quantity necessary for the optical communication (a synthesized portion of the communication signals, indicated by dotted portions in FIG. 5(*c*)) and a light quantity unnecessary for the optical communication (a synthesized portion of the reverse signals, indicated by black portions in FIG. 5(*c*)) are contained in the multiple optical signal.

Then, the light reception control section 26 causes the filter 25 to pass the synthesized portion of the communication signals S(1,*t*) to S(4,*t*) and causes the filter 25 to block the synthesized portion of the reverse signals R(1,*t*) to R(4,*t*), based on the spectrum of the received light. Here, the "spectrum of the received light" corresponds to the optical spectrum (eigenvalues) of light emitted by respective LEDs 19 in the first light emitting arrangement (a(k),b(k)) and the optical spectrum (eigenvalues) of light emitted by respective LEDs 19 in the second light emitting arrangement (a(k+1),b(k+1)) respectively.

For example, a light quantity of the first light emitting arrangements (a(3),b(3)) and (a(7),b(7)) and a light quantity of the second light emitting arrangements (a(2), b(2)) and (a(6), b(6)) are contained at the unit time t=2. In this event, a synthesized portion of a light quantity of the first light emitting arrangements (a(3),b(3)) and (a(7),b(7)) is extracted based on the optical spectrum of light emitted from the respective LEDs 19 in the first light emitting arrangements (a(3),b(3)) and (a(7),b(7)), and a synthesized portion of a light quantity of the second light emitting arrangements (a(2),b(2)) and (a(6),b(6)) is cut off based on the optical spectrum of light emitted from the respective LEDs 19 in the second light emitting arrangements (a(2),b(2)) and (a(6),b(6)).

In S7, the light reception control section 26 divides the extracted synthesized portion by the number of signals i based on the optical spectrum of light emitted from the respective LEDs 19 in the first light emitting arrangement (a(k),b(k)) [k=2×i−1] in the light emitting device group p(i) at the unit time t=2 to generate the input signals {P(1,2);0},{P(2,2);1}, {P(3,2);0}, and {P(4,2);1}, and then outputs these signals to the receiver side PC3 via the data output section 17.

Such processes in S6 and S7 are similar at the unit time t=1, 3 to 8.

As described above, according to the present embodiment, the arrangement of the LEDs 19 has a combination of LEDs 19 which makes the complementary color relation (a,b) to generate white light by synthesis and forms one optical communication channel, the combination being made to be the light emitting device group p(i) as a constituent unit. Therefore, the light emitting device group p(i) can emit light synchronously as the optical signal for the communication and the optical signal for the light adjustment, and thus a flicker of the illumination light can be prevented while maintaining the white light continuously, with the light emitting device group p(i) as one unit.

In particular, in the case of the present embodiment, the light emitting device group p (i) is repeatedly arranged over the illumination surface of the light source unit 18, while assuming that a number of light emitting device groups in one aggregation is the same as that of the input signals (p(1) to p(4)). Therefore, a constant light quantity can be always maintained on the illumination surface of the light source unit 18 during the optical communication.

Also, according to the present embodiment, even when the first light emitting arrangement (a(k),b(k)) used for the optical communication does not emit light, a light quantity of the light source unit 18 as a whole can be maintained uniform by causing the second light emitting arrangement (a(k+1),b(k+1)) not used for the optical communication to emit light. Therefore, the light can be emitted at a uniform light quantity from the light source unit 18 as a whole regardless of ON/OFF of the input signals, and thus a flicker of the illumination can be prevented.

In particular, in the case of the present embodiment, as for the light source unit 18, the light emitting device group p(i) includes the first light emitting device arrangement which turns ON/OF in the optical communication and the second light emitting device arrangement (a(k+1),b(k+1)) which emits light to supplement an insufficient light quantity when the first light emitting device arrangement does not emit light. Therefore, a constant light quantity can be always maintained in the light emitting device group p(i) during the optical communication.

The electric signal generating section 14 and the light source control section 15 cause the first light emitting arrangement (a(k),b(k)) of the light source unit 18 to emit light based on the communication signal S(i) and cause the second light emitting device arrangement (a(k+1),b(k+1)) to emit light based on the reverse signal R(i). As a result, the above advantages can be achieved.

Also, according to the present embodiment, the optical receiving apparatus 20 extracts the input signal P(i) only from the optical signals emitted from the first light emitting arrangement (a(k),b(k)) used for the optical communication, and cuts off the optical signals emitted from the second light emitting device arrangement (a(k+1), b(k+1)) not used for the optical communication, based on the spectrum of the received light. Therefore, the optical receiving apparatus 20 can receive only the communication signal, which is transmitted together with the light adjusting signal from the optical transmitting apparatus 10, with good precision.

Next, another preferred embodiment (second embodiment) of the optical communication system of the present invention will be explained with reference to FIG. 6 and FIG. 7 and other figures such as FIG. 1, hereunder.

Figure 6:
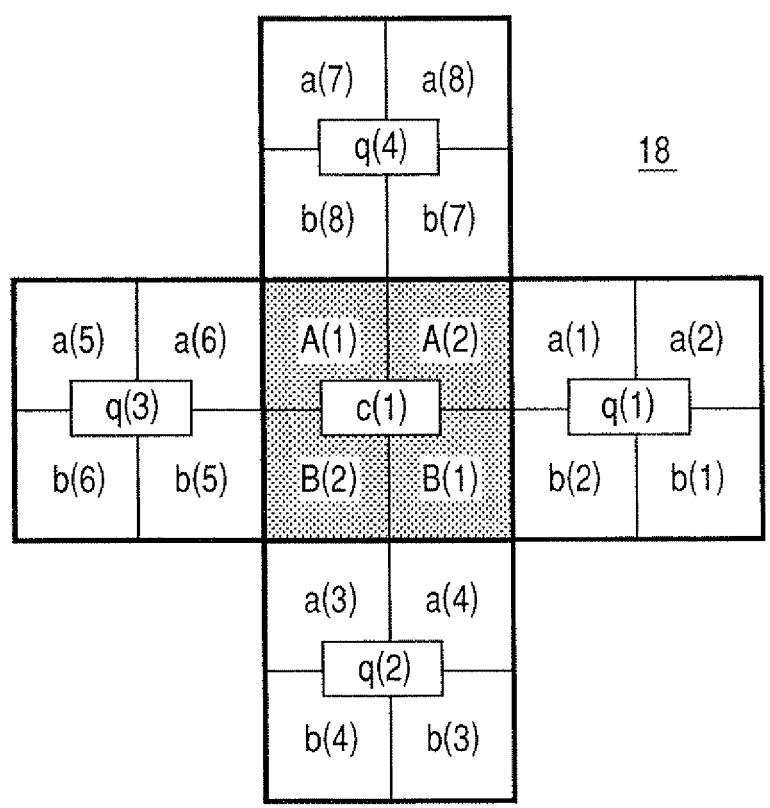
FIG. 6 A view showing a second arrangement pattern of LEDs of a light source according to a second embodiment, FIG. 7 (a) is a view showing a sum of a light quantity of a light emitting device group in the second embodiment, (b) is a view showing a light quantity of a light adjusting device group in the second embodiment, (c) is a view showing a light quantity of a light source in the second embodiment, and (d) is a view showing a light quantity of a light source according to another embodiment.

FIG. 6 is a view showing an arrangement of LEDs of a light source in the present embodiment (second embodiment). FIG. 7(*a*) is a view showing a sum of a light quantity of a light emitting device group in the present embodiment, FIG. 7(*b*) is a view showing a light quantity of a light adjusting device group in the present embodiment, and FIG. 7(*c*) is a view showing a light quantity of a light source in the present embodiment.

The optical communication system of the present embodiment is different mainly in that, in the optical transmitting apparatus 10, the LEDs 19 are arranged on the illumination surface of the light source unit 18 in accordance with a second arrangement pattern, and control of the electric signal generating section 14 and the light source control section 15 corresponding to that, etc. Such differences will be explained hereunder, but explanation of remaining configurations will be omitted herein by attaching the same reference symbols as those in the first embodiment, As shown in FIG. 6, a light emitting device group (color combination device group) p(i) in the second arrangement pattern of the LEDs 19 includes a communication device group q(i) that turns ON/OFF in response to the input signal P(i) during the optical communication, and a light adjusting device group c that emits light to supplement an insufficient light quantity when any device of the communication device group q(i) does not emit light.

Such second arrangement pattern is formed in a "cross" shape in which the light adjusting device group c is arranged at the center portion and the communication device groups q(1) to q(4) are arranged around the light adjusting device group c.

The communication device group q(i) [i; number of signals] is arranged in a square cell so that two sets of light emitting device groups (a(k),b(k)) and (a(k+1),b(k+1)) [k=2× i−1] satisfy the complementary color relation respectively.

All LEDs 19 in (a(k),b(k)) and (a(k+1),b(k+1)) are turned ON/OFF in synchronism with the electric signal.

The light adjusting device group c is arranged in a square cell so that two sets of light emitting device groups (A(1), B(1)) and (A(2), B(2)) satisfy the complementary color relation respectively. All the LEDs 19 in (A(1), B(1)) and (A(2), B(2)) are turned ON/OFF in response to the flashing of the communication device group p(i), and are constructed such that their light intensity can be varied in response to a sum of a light quantity of the communication device group p(i).

The electric signal generating section 14 generates the communication signal S(i) indicating the ON/OFF of the LEDs 19 and the light adjusting signal C which supplements an insufficient light quantity for a total light quantity, with respect to the light source unit 18, in response to the input signal P(i) (i=1, 2, . . . , 4), The communication signal S(i) is similar to the first embodiment (see FIG. 5($a$)). As shown in FIGS. 7($a$), ($b$), the light adjusting signal C is the pulse signal train showing a light intensity, as for the insufficient portion (hatched portion in FIG. 7($a$)) in the total light quantity of the communication signal S(i) (see FIG. 7($b$)).

Also, the light source control section 15 causes the communication device group q(i) to emit light based on the communication signal S(i), and causes the light adjusting device group c to emit light based on the light adjusting signal C.

According to the electric signal generating section 14 and the light source control section 15, the processes in S3 to S5 in the flowchart shown in FIG. 3 are different in the process of the optical communication system of the present embodiment.

In S3, in response to a sum of a light quantity of the communication signals S(1,$t$) to S(4,$t$), the electric signal generating section 14 generates a light adjusting signal C(t) obtained by adding these "0 (OFF)" signals for every bit.

For example, as shown FIG. 5($a$) and in FIGS. 7($a$), ($b$), the communication signal is {S(1,2);0},{S(2,2);1},{S(3,2);0}, {S(4,2);1} and the light adjusting signal is {C(2);2} at the unit time t=2. Here, one unit of the light intensity of the light adjusting signal corresponds to a total light quantity of the communication device group q(1), and the light intensity of the light adjusting device group c is twice the communication device group q(i) when the light adjusting signal C(2) is "2".

In S4, the light source control section 15 selects the communication device groups q(1) to q(4) in response to the input signals P(1) to P(4). For example, the communication device group q(2) corresponds to the input signal P(2), and includes two LEDs 19 of (a(3), b(3)) and two LEDs 19 of (a(4), b(4)).

In S5, the light source control section 15 outputs the communication signal S(i,t) and the light adjusting signal C(t), and causes the communication device group q(i) to emit light based on the communication signal S(1,t) and causes the light adjusting device group c to emit light at a corresponding light intensity bases on the light adjusting signal C(t).

In this case, for example, as shown in FIG. 5($a$), all the communication signals S(1,1) to S(4,1) are "1 (ON)" signal at the unit time t=1 and all the communication device groups q(1) to q(4) are turned ON. Thus, an insufficient light quantity is "0".

Therefore, the light adjusting signal C(1) is "0", and the light adjusting device group c is turned OFF.

Also, as shown in FIG. 7($a$), a sum of a light quantity of the communication signals S(2,2) to S(4,2) "2" at the unit time t=2 and an insufficient light quantity is "2". Therefore, the light adjusting signal C(2) is "2", and the light adjusting device group c is emitting the light at a light intensity of 2.

The above is similar as for the unit time t=3 to 8.

As described above, according to the present embodiment, the light emitting device group p(i) on the light source unit 18 includes the communication device group q(i) that turns ON/OFF during the optical communication, and the light adjusting device group c that emits light to supplement an insufficient light quantity when the light emitting device group does not emit light. Therefore, a constant light quantity can be always maintained among the light emitting device group p(i) during the optical communication.

With respect to such light source unit 18, the electric signal generating section 14 and the light source control section 15 cause the communication device group q(i) to emit light based on the communication signal S(i) and cause the light adjusting device group c to emit light based on the light adjusting signal C. As a result, the above advantages can be achieved.

Other advantages are similar to those in the first embodiment.

The present invention is not limited to the first and second embodiments and can be varied variously.

In the present invention, the light emitting device may be arranged in the light emitting device group as a constituent unit, and in the light emitting device group, the light emitting devices make the particular visible color light by the color synthesis and form one optical communication channel. Like the first and second embodiments, a combination of the light emitting devices of two colors in the complementary color relation may be used to emit the white light and to form one optical communication channel. Also, the light emitting devices of the three primary colors of RGB may be respectively used to emit the white light and to form one optical communication channel. Also, the emitted light is not limited to the white color and any color may be employed if such color can be employed as the illumination light.

Also, in the first embodiment, the first light emitting device arrangement for the optical communication and the second light emitting device arrangement for the light adjustment are arranged uniformly, and by the alternative selection of any of the arrangements, the light emitting devices are turned on so that a light quantity of the light source as a whole unit can be always uniform in uniform region irrespective of the contents of the communication signals (same as the input signals). In the second embodiment, since the light intensity is adjusted by the light adjusting device group for adjusting light for the insufficient light quantity with respect to the sum of the light quantity of the communication device group for the optical communication, the light emitting devices are turned on so that the light quantity of the light source unit as a whole can be always uniform irrespective of the contents of the communication signals. But the present invention is not limited to these embodiments. A light quantity of the light source unit as a whole may be made uniform by combining the alternative selection of the light emitting device group for the communication and the light emitting device group for the light adjustment with adjustment of the light intensity of the light emitting device group for the light adjustment. Otherwise, the light emitting device group for the light adjustment may be selected to emit light in response to the turning ON/OFF of the light emitting device group for the communication such that a light quantity of the light source unit as a whole may be made uniform.

In addition, in the second embodiment, both the communication device group and the light adjusting device group are formed of the LEDs. But the light adjusting device group may be formed of a fluorescent lamp. In this case, since the fluorescent lamp has a wider light intensity range than the LED, the light adjusting device group formed of the fluorescent lamp is more advantageous than the light adjusting device group formed of the LEDs.

Further, in the second embodiment of the present invention, the electric signal generating section 14 may generate an amplified communication signal by adding a direct current component indicating a constant amplitude to the communication signal S(i), and generate an amplified light adjusting signal by adding this direct current component to the light adjusting signal C. Also, the light source control section 15 may cause the communication device group q(i) to emit light based on the amplified communication signal and also may cause the light adjusting device group c to emit light based on the amplified light adjusting signal.

Figure 7A:
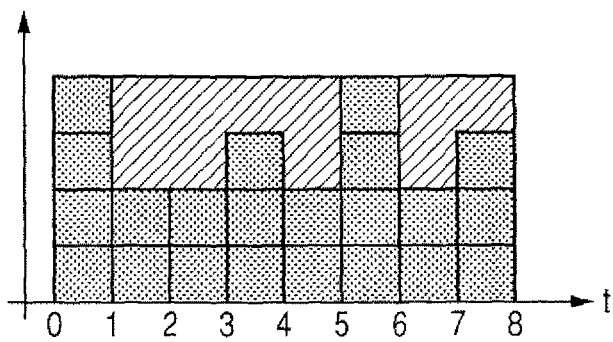
Figure 7B:
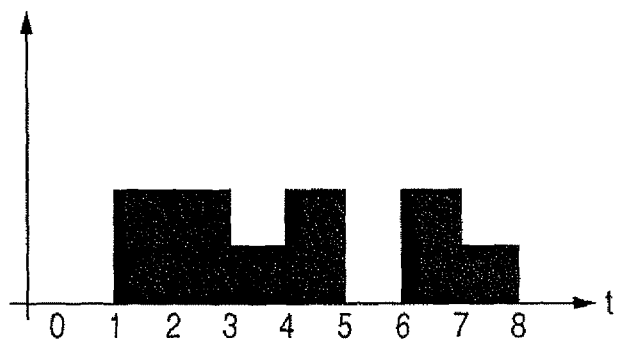
Figure 7C:
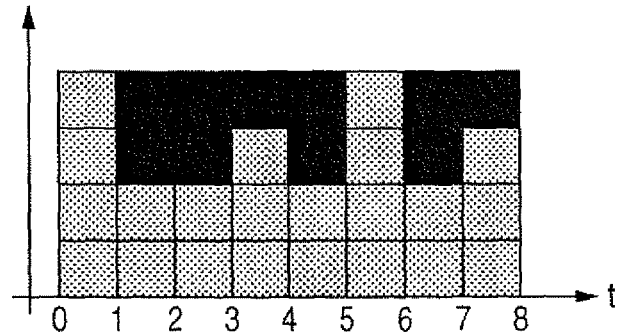
Figure 7D:
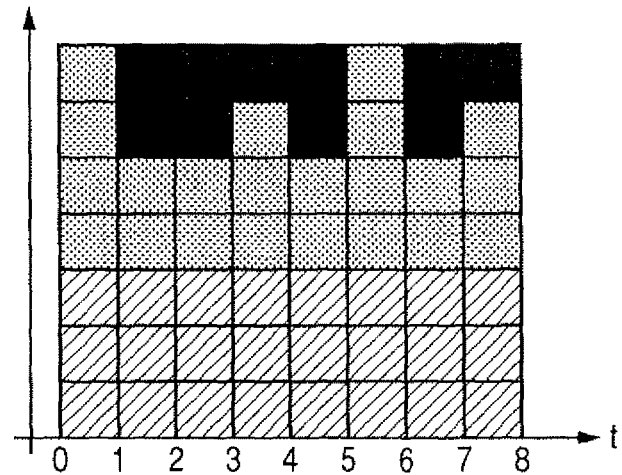

Now, FIG. 7(d) is a view showing a light quantity of a light source according to such variation. As shown in FIG. 7(d), there is such an advantage that the light source unit 18 becomes brighter to the extent that the direct current component (hatched portion in FIG. 7(d)) is added to the constant sum of the light quantity of the communication device group q(i) and the light adjusting device group c.

INDUSTRIAL APPLICABILITY

According to the configurations in (1) to (16) of the present invention, the color combination device group in which the light emitting devices make the particular visible light color by the color synthesis and form one optical communication channel is selected, and then the color combination device groups are caused to emit light synchronously. Therefore, a flicker of the illumination light can be prevented while maintaining a particular color light continuously.

Also, even when the light emitting devices used for the optical communication do not emit light, a light quantity of the light source unit as a whole can be made uniform by causing the light emitting devices not used for the optical communication to emit light. Therefore, a uniform light quantity can be maintained in the light source unit as a whole irrespective of the contents of the input signals, and thus a flicker of the illumination can be prevented. As a result, the present invention has great industrial applicability.

Here it should be noted that the present invention is not limited to the above embodiments.

The invention claimed is:

1. An optical transmitting apparatus, comprising:
an electric signal generating section generating an electric signal by converting a predetermined input signal;
a light source in which a plurality of light emitting devices are arranged and that converts the electric signal into an optical signal; and
a light source control section that turns ON/OFF the light emitting devices to emit light,
wherein the optical transmitting apparatus emits visible light by emission of the light emitting devices and performs optical communication by turning ON/OFF the light emitting devices,
wherein, when at least one of the plurality of the light emitting devices used for the optical communication does not emit light, the light source control section controls an adjustment light emitting device for supplying a light quantity to emit light so that a total light quantity of the light source becomes substantially uniform.

2. The optical transmitting apparatus according to claim 1, wherein
the light source control section selects a color combination device group which forms one optical communication channel and makes a particular visible light color by color synthesis, and
the light source control section causes the color combination device group to emit light.

3. The optical transmitting apparatus according to claim 2, wherein the color combination device group is formed of the light emitting devices of two colors that make a white light by complementary colors, or the light emitting devices of three colors that make a white light by three primary colors of light.

4. The optical transmitting apparatus according to claim 2, wherein
the color combination device group is arranged repeatedly over an illumination surface of the light source, and
a number of the color combination device groups are arranged in one aggregation being the same as that of input signals.

5. The optical transmitting apparatus according to claim 1, wherein the light control section controls the respective light emitting devices so as to maintain the total light quantity substantially uniformly.

6. The optical transmitting apparatus according to claim 1, wherein the light control section controls the respective light emitting devices so as to maintain a balance of light quantity of the plurality of light emitting devices substantially uniformly.

* * * * *